United States Patent

[11] 3,579,862

| [72] | Inventor | Sue Ballen |
| | | 651 Desert Lane, Las Vegas, Nev. 89106 |
| [21] | Appl. No. | 824,921 |
| [22] | Filed | May 15, 1969 |
| [45] | Patented | May 25, 1971 |

[54] SET A TABLE PUZZLE
1 Claim, 4 Drawing Figs.
[52] U.S. Cl. .................................................... 35/8,
273/156
[51] Int. Cl. ...................................................... G09b 1/10,
A63f 9/08
[50] Field of Search .......................................... 35/1, 8, 21,
23.5, 40, 42; 273/156, 157

[56] References Cited
UNITED STATES PATENTS
| 2,244,590 | 6/1941 | Vonderheid.................. | 35/1 |
| 2,674,813 | 4/1954 | Hutchinson.................. | 35/21X |

*Primary Examiner*—Wm. H. Grieb

ABSTRACT: An educational toy particularly for girls and for teaching them the proper place setting of a table, the device comprising a base panel having various design-shaped indentations for receiving corresponding configured protrusions on the undersides of various dishes and other table placement items, thus serving as a puzzle for proper alignment of corresponding design indentation and protrusions while at the same time serving an educational purpose.

PATENTED MAY 25 1971 3,579,862
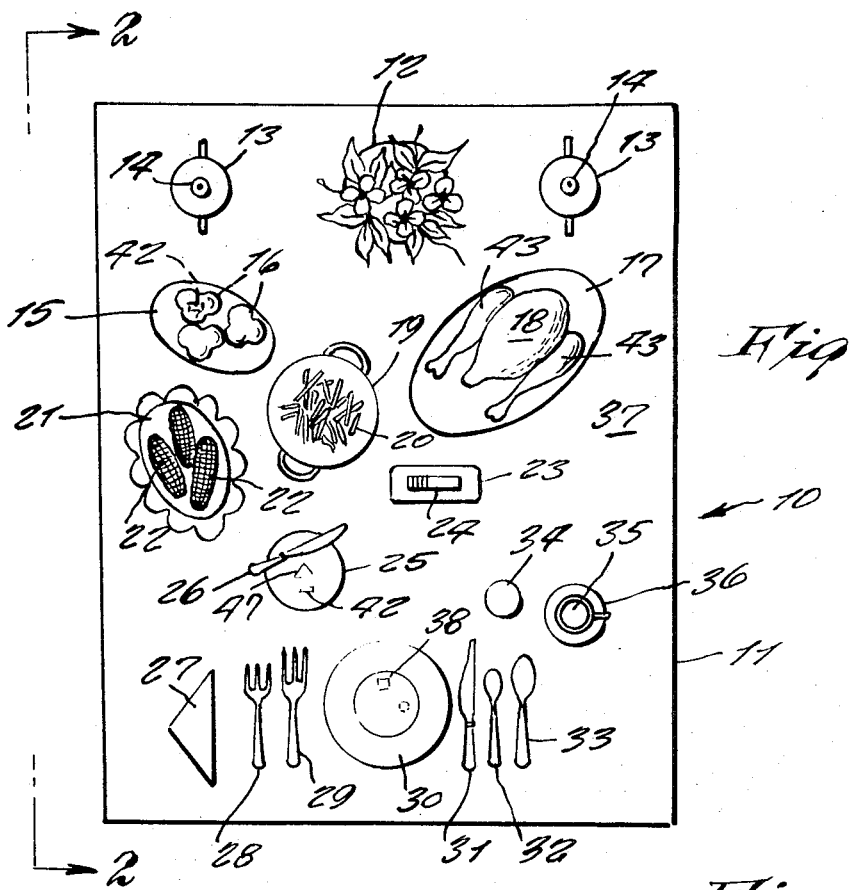
Fig. 1
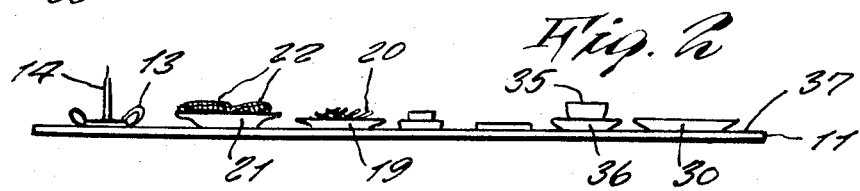
Fig. 2
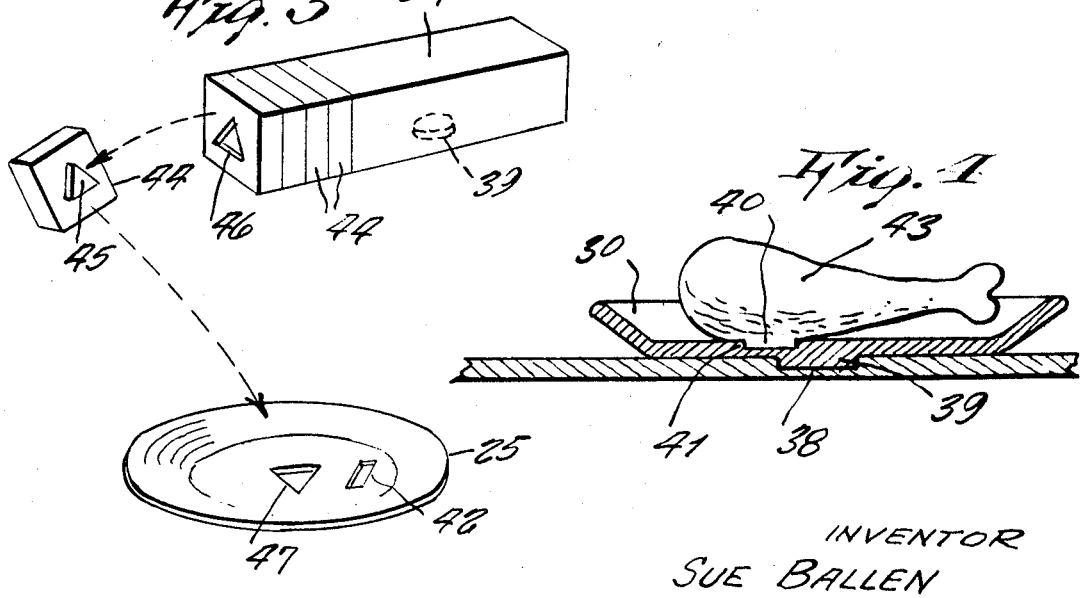
Fig. 3
Fig. 4
INVENTOR
SUE BALLEN

SET A TABLE PUZZLE

This invention relates generally to puzzles.

A principle object of the present invention is to provide an educational toy designed particularly for girls and to teach them the proper placement of various items in a place setting of a table.

Another object of the present invention is to provide a set-a-table puzzle which while proving educational at the same time offers entertainment and diversion.

Other objects of the present invention are to provide a set-a-table puzzle which is simple in design, inexpensive to manufacture, rugged in construction, easy to use and efficient in operation.

These and other objects will be readily evident upon a study of the following specification and the accompanying drawing wherein:

FIG. 1 is a top plan view of the present invention shown assembled,

FIG. 2 is a side elevation view thereof as viewed along the line 2–2 of FIG. 1,

FIG. 3 is a perspective view showing one of the items thereof and indicating how the item is transferred between different positions in the assembly, and FIG. 4 is a cross-sectional view showing the transfer of one position to another position in the assembly.

Referring now to the drawing in detail, the reference numeral 10 represents a set-a-table puzzle according to the present invention wherein there is a rectangular base panel 11 which represents a table top.

As shown in FIG. 1 of the drawing, the properly assembled puzzle 10 includes a number of items placed upon the panel 11, each of which must be properly located. These items include a bowl of flowers 12 a pair of candle holders 13 supporting candles 14, a bread basket 15 holding rolls 16, a platter 17 holding a turkey 18, a dish 19 holding french fried potatoes 20, a dish 21 holding several ears of corn on the cob 22, a butter dish 23 holding a bar of butter 24, a bread plate 25 and a butter knife 26, a napkin 27, salad fork 28, fork 29, service plate 30, knife 31, teaspoon 32, soup spoon 33, a water glass 34, and a tea cup 35 on a tea cup saucer 36.

As shown in FIG. 4 on the drawing, the table top surface 37 of the panel 11 is provided with a plurality of indentations 38, each indentation being of a different shape or size than the other. Each dish or other item placed upon the table top 37 of the panel 11 is provided with a downwardly extending projection 39 on the underside thereof, each projection being of a different size and shape than the other projections so that it is receivable in only one particular indentation upon the panel to be correctly positioned. Thus the present invention comprises a puzzle wherein each of the items must be properly positioned upon the panel 11.

As is further shown in FIG. 4 of the drawing, the various items of food placed upon the dishes are removable from the dishes, each of the food items being likewise provided with a downward extending projection 40 that is receivable within a correspondingly designed and properly sized indentation 41, thus readily educating to the player of the puzzle a proper place where such food item should be positioned.

It will now be apparent that the rolls 16 on the bread basket 15 are provided with projections on the underside thereof which are of a particular shape and size, as shown at 42 so to make the rolls receivable within the basket 15 and which likewise will be receivable within the indentation identified with the number 42 on the individual bread plate 25, thus educating the player a proper place for positioning of the rolls when taken from the basket and set before a person for being eaten.

As shown in FIGS. 1 and 4, it is evident that the drumstick 43 of the turkey 18 is removable from the turkey body 18 and is transferrable to the service dish 30, it being understood that the projection 40 on the turkey drumstick is receivable within indentation 38 of the service plate 30. Likewise, it is understood that the turkey body 18 has corresponding design and shape indentations 41 so to receive the projections 40 of the drumstick prior to the removal of the drumstick therefrom.

As shown in FIG. 3 of the drawing, the bar of butter 24 includes a circular shaped projection 39 on the underside thereof so to be engageable with the corresponding indentation in the butter dish 23. The bar of butter 24 is formed with a plurality of removable butter pats 44, each pat 44 having a projection 45 receivable selectively within an indentation 46 of the pat adjacent thereto when assembled, so to form a complete bar of butter.

Alternately, the projection 45 is receivable within an indentation 47 in the individual bread dish 25.

Thus it is evident in operative use, that the various pieces may be attempted to be properly positioned upon the panel so to form an educational puzzle.

Alternately, while the present invention comprises a puzzle for educating the proper setting of a table to girls, the present invention may be financially and profitable sold to hotels and the like as a means for training the waiters and waitresses of how to set a table and serve food.

I claim:

1. In a set a table puzzle, the combination of a rectangular panel, said panel representing a table top, a plurality of individual pieces placeable upon said panel, said pieces representing various items normally placed upon a table for use by a person when dining at a table, and means whereby said pieces may be properly positioned upon said panel so to form a correct place setting of a table, said pieces placeable upon said table top panel comprising a bowl of flowers, a plurality of candle holders containing candles, a bread basket containing a plurality of rolls, a turkey platter holding a turkey, a dish holding a plurality of french fried potatoes, a dish holding a plurality of corn on the cob members, a butter dish holding a bar of butter, a bread plate, a butter knife supported upon said bread plate, a service plate, a napkin, a salad fork, a fork, a knife, a teaspoon, a soup spoon, a water glass, a tea cup and a tea cup saucer, each of said pieces being provided with a downwardly extending projection and said table top surface of said panel being provided with a plurality of downward extending indentations for receiving said projections, each of said projections being of a different size and shape from the other, and said indentations being likewise of a different size and shape from each other so that each projection is receivable in only a particular one indentation, and said dishes, plates and platter members each having said projections on the under side thereof while having indentations upon the upper side thereof, thereby each piece thereof having both a projection and indentation can be located intermediate said table top panels and said pieces as bar of butter, turkey, french fried potatoes and the like.